United States Patent [19]

Visel et al.

[11] Patent Number: 5,511,058
[45] Date of Patent: Apr. 23, 1996

[54] DISTORTION CORRECTION OF A RECONSTRUCTED HOLOGRAPHIC DATA IMAGE

[75] Inventors: Thomas A. Visel; John Stockton; Joel H. Regen, all of Austin, Tex.

[73] Assignee: Tamarack Storage Devices, Austin, Tex.

[21] Appl. No.: 173,668

[22] Filed: Dec. 23, 1993

[51] Int. Cl.$^6$ .............................. G11B 7/00; G03H 1/02; G03H 1/22
[52] U.S. Cl. .................... 369/103; 369/107; 369/112; 369/124; 359/3; 359/32
[58] Field of Search .................... 369/103, 112, 369/283, 107, 124; 359/1–9, 32

[56] References Cited

U.S. PATENT DOCUMENTS 5,377,176  12/1994  Redfield .................... 369/103
5,379,266   1/1995  Russell  .................... 369/103

Primary Examiner—Georgia Y. Epps
Assistant Examiner—Kim-Kwok Chu
Attorney, Agent, or Firm—Gregory M. Howison

[57] ABSTRACT

A detected image output by a holographic storage system is comprised of a grid of dark and light spots, representing high and low logic states. The image is superimposed onto a grid of detector elements or pixels in a detector. Each of the data bits is represented by a bit image or bixel, which is oversampled by a factor of two along the x- and y-axis by the pixels. A state machine is utilized to generate expected states for each of the pixels and then an energy shifting operation performed to shift energy from a pixel having a higher than expected output value to a pixel having a lower than expected output value. This operation can result in energy being shifted from the left to the right or the right to the left. Column synchronization is performed by defining a set of pixels in a row for each column as a segment with an associated parity bit and row number. Each segment may be output as validated, or may be retained in a buffer until all previous segments in a row have been accumulated and/or output.

12 Claims, 8 Drawing Sheets

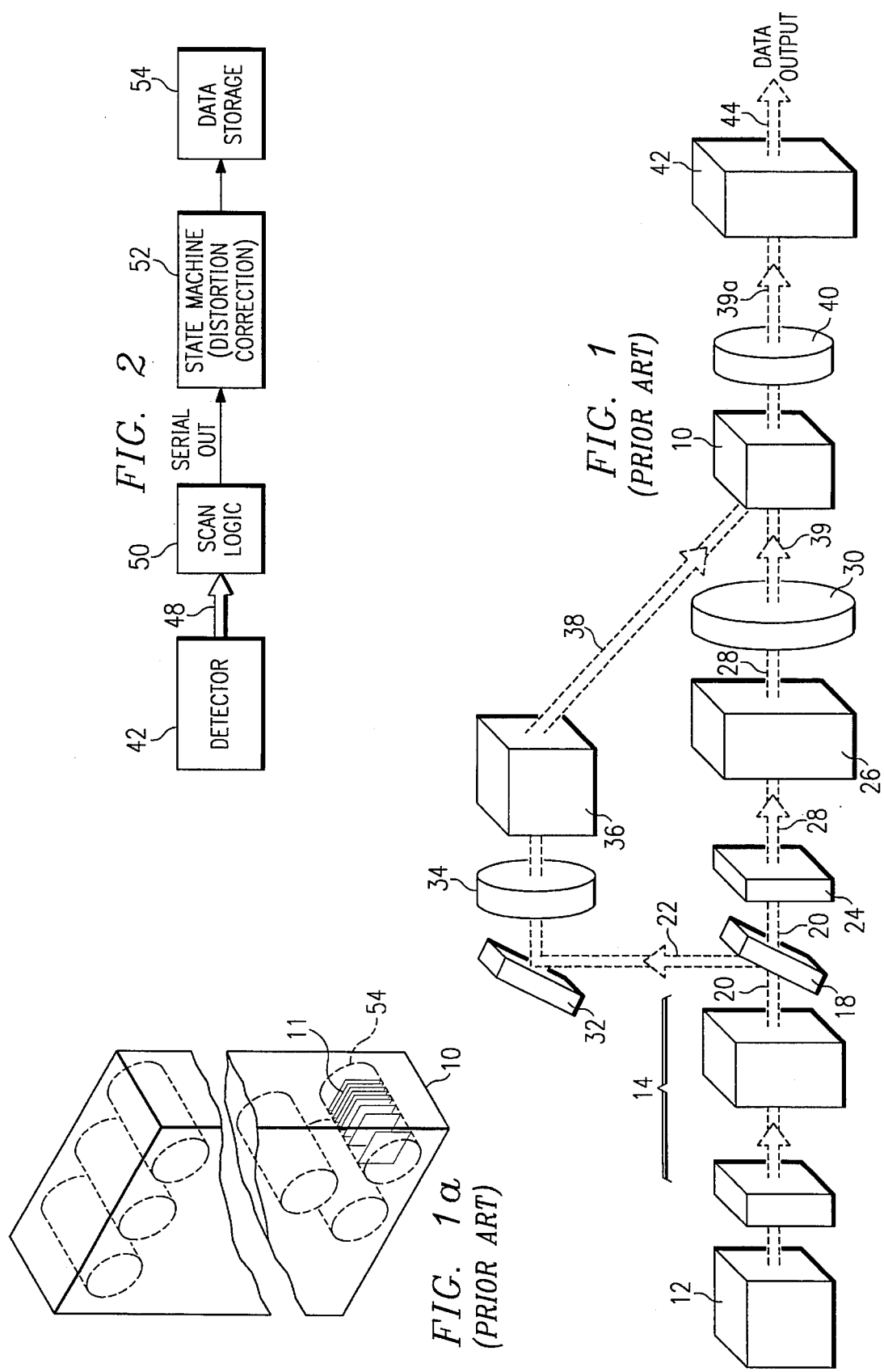

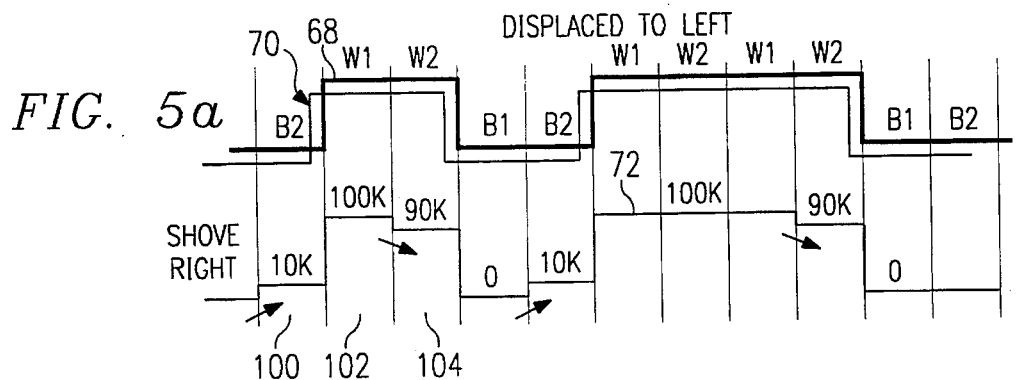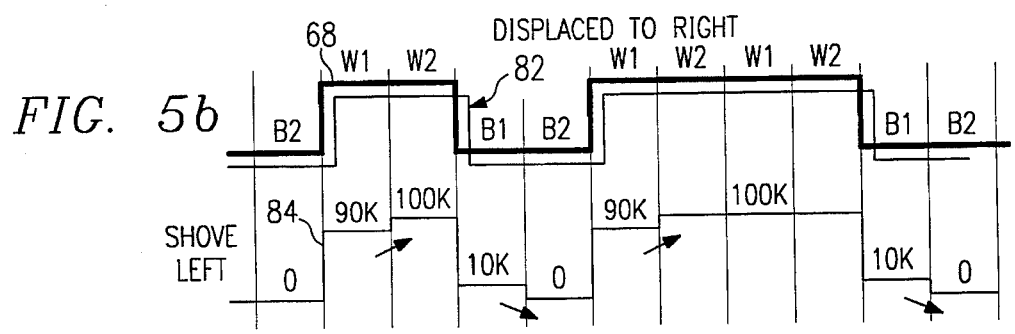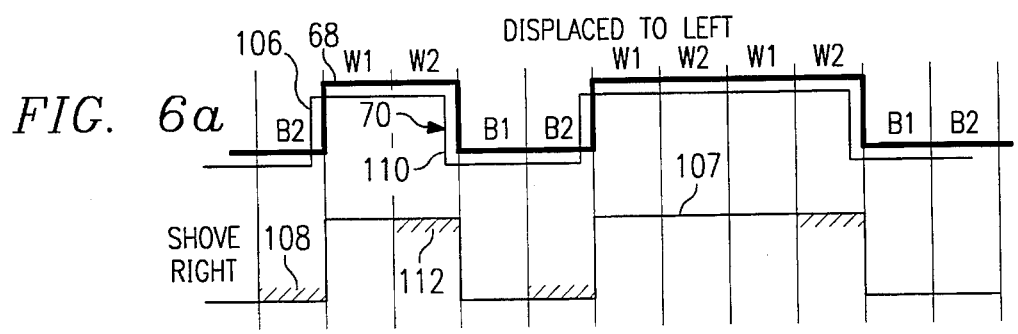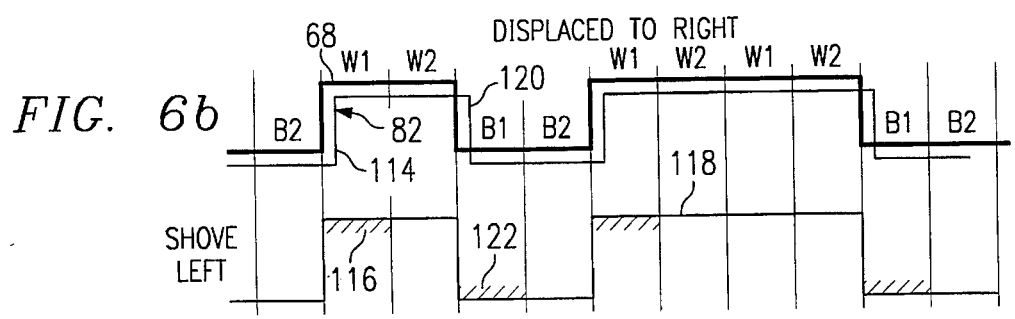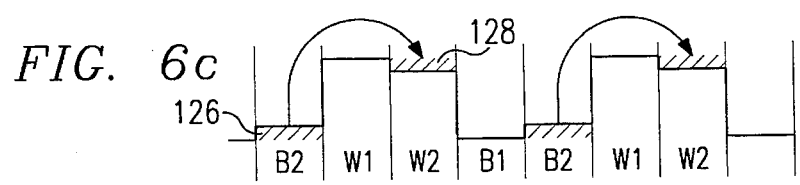

DISPLACED TO LEFT

DISPLACED TO RIGHT

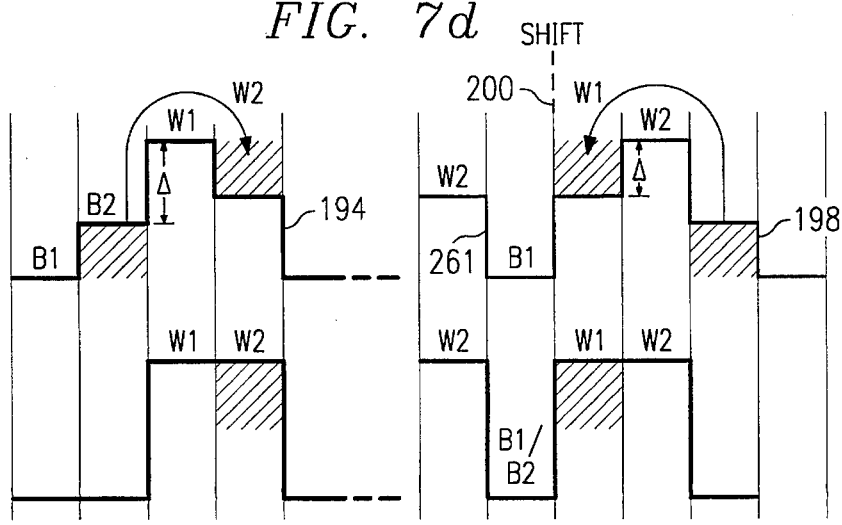
FIG. 7d
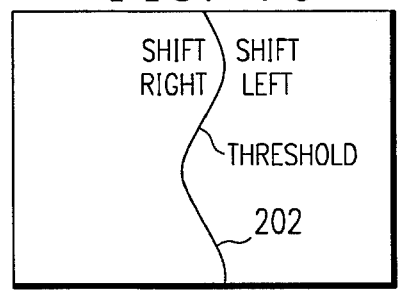
FIG. 7e
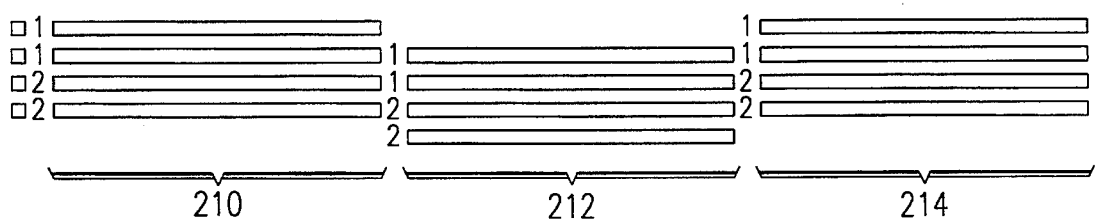
FIG. 8a
FIG. 8b
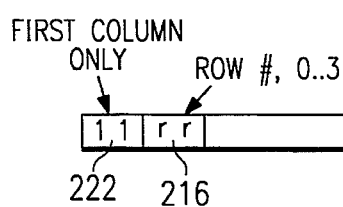
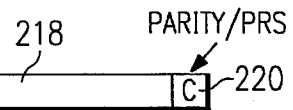

DISTORTION CORRECTION OF A RECONSTRUCTED HOLOGRAPHIC DATA IMAGE

TECHNICAL FIELD OF THE INVENTION

The present invention pertains in general to holographic memories, and more particularly, to the recovery of information from the detected image during a Read operation from the holographic memory.

As the need for increased data storage changes, the search for higher density, faster access memory technologies also increases. One of these, holographic data storage, provides the promise for increased access to higher density data. The techniques for realizing such storage typically utilize some type of storage media, such as photorefractive crystals or photopolymer layers, to store 3-D "stacks" of data in the form of pages of data. Typically, coherent light beams from lasers are utilized to perform the addressing, writing and reading of the data from the storage media by directing these beams at a specific region on the surface of the media. Writing is achieved by remembering the interference pattern formed by these beams at this region. Reading is achieved by detecting a reconstructed light beam as it exits the storage medium, the data then being extracted therefrom. Addressing is achieved by the positioning of the laser beams, and this is typically done through the mechanical movement of mirrors or lenses; however, the storage media itself can be moved relative to fixed laser beams.

During a Read operation, a given storage location within the holographic storage media is irradiated with a reference laser beam to generate a reconstructed data beam. The reconstructed data beam contains the information that was stored in the holographic storage media. This information is in the form of an image of a data pattern. This data pattern is typically comprised of a grid of "dark" and "light" images, the "light" images representing a logic "1" and the "dark" images representing a logic "0". The image of each of the individual data bits is defined as a two-dimensional bit pixel or "bixel". During data recovery, the reconstructed data image is directed toward a detector array, which detector array comprises a plurality of CCD elements, one or more associated with each of the bixels. In a typical oversampled system, there may be four CCD elements for each data bit or bixel, each of these individual CCD elements defining a "pixel".

Since the initial encoded data that is stored in the holographic storage media is an image of a data pattern, the reconstructed data is also an image. However, due to imperfections in the optical systems for recording, and subsequently reconstructing the image, there may be distortions and offsets in the data relative to the CCD elements, which CCD elements are arranged in a grid. As such, the individual bixels may have a slight offset relative to the associated CCD elements or pixels. This can cause moire patterns in the detected image. In order to correct for this, some type of processing must be performed on adjacent pixels, which can consume a large amount of processing capacity and result in an excessively complex system.

SUMMARY OF THE INVENTION

The present invention disclosed and claimed herein comprises a method for distortion correction of a reconstructed holographic data image that is comprised of a two dimensional grid of bit images or bixels that are disposed in rows or columns of either dark bit images or light bit images. A detection grid of imager pixels is provided that is arranged in rows or columns corresponding to the bit images. The imager pixels are operable to detect the bit images when the bit images are disposed thereover. The data image is then directed onto the detection grid and each row of image pixels is scanned to determine the outputs thereof. The transitions between dark images and light images are then examined to determine if a portion of a light image overlaps the boundary between two adjacent images or pixels. If so, the output energy of the pixel that is overlapped is subtracted from that pixel and summed with at least the output of another one of the imager pixels to provide a reconstructed image that is substantially shifted relative to the boundary of the image pixels.

In another aspect of the present invention, the imager pixels are configured such that they provide, in one embodiment, a 2:1 oversampled ratio wherein two rows of imager pixels are associated with each row of bit images and two columns of imager pixels are associated with each column of bit images. A light image results in a pixel with a full output when the light image is disposed over substantially the entire imager pixel, and a dark image results in substantially no output when disposed over substantially the entire imager pixel. In one mode, when an imager pixel having less than a full output precedes an imager pixel having a full output, the energy is transferred forward in time during the scan to the next imager pixel having less than a full output that follows an imager pixel having a full output. Alternately, the shifting operation can be reversed such that an imager pixel with less than a full output preceding an imager pixel with a full output is raised to a full output, with an imager pixel having less than a full output following an imager pixel with a full output having the output thereof reduced to substantially zero.

BRIEF DESCRIPTION OF THE DRAWINGS

For a more complete understanding of the present invention and the advantages thereof, reference is now made to the following description taken in conjunction with the accompanying Drawings in which:

FIG. 1 illustrates an overall block diagram of a Prior Art holographic storage assembly, FIG. 1a illustrates a simplified detail of a Prior Art recording media;

FIG. 2 illustrates an overall block diagram for the system of the present invention for correcting the detected data image;

FIGS. 5a and 5b illustrate the state machine states assigned to expected pixel slots;

FIGS. 6a and 6b illustrate the technique for energy shifting;

FIG. 6c illustrates a detail of the energy shifting operation;

FIG. 7d illustrates a detail of a row segment;

FIG. 7e illustrates a diagrammatic view of the left/right shift operation during space lock;

FIG. 8a illustrates the operation for providing correction along the Y-axis;

FIG. 8b illustrates an overall diagrammatic view of the pixels associated with the operation of FIG. 8a;

DETAILED DESCRIPTION OF THE INVENTION

Figure 4A:
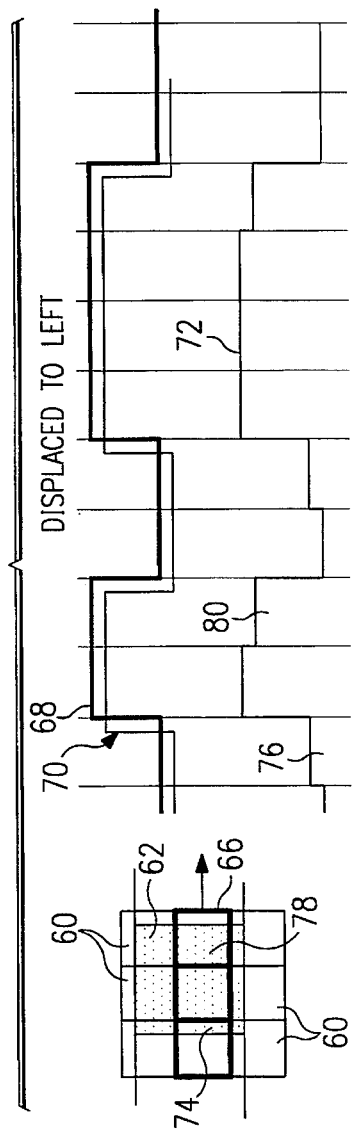
FIGS. 4a and 4b illustrate diagrammatic views of the raw data image displaced on the detector.

Referring now to FIG. 1, there is illustrated a holographic storage assembly which is operable to store data in a transparent holographic storage recording media 10 and extract that data therefrom. The data is organized in the recording media as an array of stacks of pages 11 (images). This is illustrated in FIG. 1a, wherein each of the stacks of pages 11 occupies a small region 54 of the recording media 10, with each of the pages in each of the regions 54 comprising an interference grating, all of the interference gratings in a given region 54 superimposed over each other. A laser 12 is provided, which can be comprised of, for example, a diode-pumped YAG (yttrium aluminum garnet) laser with a power output of around 80 milliwatts, with a wavelength in the range of 532 nanometers. The output beam of the laser is processed by a stack-selector assembly 14 which steers the beam to the location of an individual stack of pages 11 in the recording media 10. The output of the stack selector assembly 14 is then passed to a beam splitter 18 which separates the beam into two beams, a data beam 20 and a reference beam 22.

The data beam 20 is expanded by a beam expander 24 which is then input to a Spatial Light Modulator (SLM) 26 to output an expanded data beam 28. The SLM 26 receives data from a computer system (not shown) and then this data is superimposed on the expanded data beam 28 by the SLM 26, creating a bit pattern of light and dark spots in the conventional manner. This pattern of spots represents the bits on the page to be stored. After the SLM 26, the data beam is then passed through a focusing system 30 which then focuses the beam onto a select portion of the surface of the holographic storage media 10. This focused data beam 39 is the Fourier transform of the pattern of spots, or page.

The reference beam 22 is reflected from a mirror 32 and then passed through a polarization rotator 34, the polarization orientation dictated by an external control signal. This rotator is utilized to adjust the polarization of the reference beam 22 during a read operation. The output of the polarization rotator 34 is then input to a page addressing deflector system 36 system which defines the angle at which the reference beam will impinge the surface of the recording media 10 and also the location thereof on the surface of the recording media 10. This is represented by a deflected reference beam 38.

As the two beams, the data beam and the reference beam, enter the recording media 10, the reference beam interferes with the data beam, writing an interference grating in the storage media 10. In the case of a photorefractive material, the grating pattern results from a stored electronic-charge pattern that modifies the optical properties of the crystallite. In the case of photopolymer material, certain areas of the photopolymer material are polymerized to form the interference grating. The result is a 3-D holographic image of the Fourier transform of the bit pattern carried in the data beam. This stored interference grating allows the original data beam to be recreated when the system reads the data. This process on which the interference grating is formed on the recording media 10 is basically the Write process for a holographic storage material.

The Write process is repeated a number of times, with the angle of the reference beam operable to be changed each time, to record a plurality of interference gratings. Each of the interference gratings is associated with a different input bit pattern, which interference gratings are superimposed over each other. This collection of superimposed recordings is called a stack. The recordings that comprise each of the stacks are angularly multiplexed within each of the stacks.

During a Read cycle, the data beam is shut off so that only the deflected reference beam 38 is input to the storage media 10 at the appropriate angle and location. The angle is determined by the desired page in that particular stack. The deflected reference beam 38 will be constructively diffracted by the interference grating that was recorded with a particular underlying spatial frequency that corresponds to the deflected reference beams particular angle. This results in a reconstructed image of the original bit pattern that stored there with a reference beam with that particular angle. The diffracted reference beam 39 or reconstructed data beam then passes through the storage media 10 into a focusing system 40 which focuses the reconstructed image onto the surface of a detector array 42 of, for example, a charge-coupled device that captures the reconstructed light and dark bit patterns of the image and then convert them back to digital electronic signals for transfer to a computer. This is represented by a data output line 44.

Referring now to FIG. 2, there is illustrated a block diagram of the system for correcting distortion in the detected image. The output of the detector 42 comprises a plurality of lines, one associated with each of the pixels or CCD elements. This is output on a set of lines 48. Of course, this can be a multiplexed system wherein each of the CCD elements could be addressed, for example, with a system utilizing active CCD elements. The output of the detector 42 is input to a scan logic block which operates in conjunction with a detector 42 to selectively output information from each of the pixels or CCD elements as a serial data output. This is input to a state machine 52 which is operable to form the distortion correction and then output this data to a data storage device 54, such as random access memory, hard disk storage, etc. As will be described hereinbelow, the pixels are accessed by row and in a serial manner along each row and the distortion correction done in a serial fashion. In this manner, a large amount of memory is not required to buffer information, followed by subsequent processing of buffered data and output of corrected data.

Figure 3:
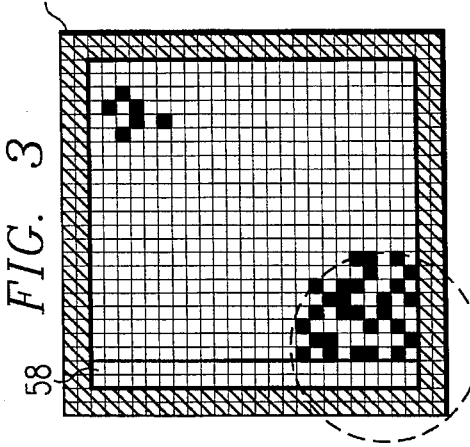
FIG. 3 illustrates a diagrammatic view of a representative detected image.

Referring now to FIG. 3, there is illustrated an overall view of a detected image after correction for all distortion therein. This effectively represents the encoded data image.

Figure 3A:
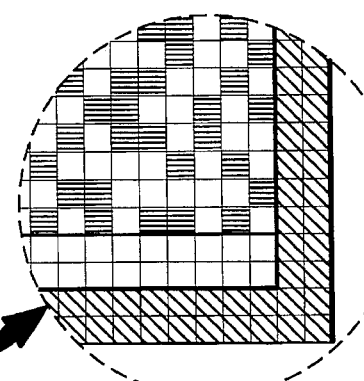
FIG. 3a illustrates a detail of one section of the detected image of FIG. 3.

FIG. 3a illustrates a detail of one corner of the detected image of FIG. 3. The detected image is formed with a dark border 56 of at least two bixel widths. Therefore, each row is initiated with a dark image. Each row has associated therewith two synchronizing bixels of light information, this represented by a strip 58 at the input to each row. Thereafter, any type of data pattern will follow comprising logic "1s" and logic "0s". These will be either dark bixels or light bixels. The use of the two synchronizing light bixels following the dark border will be described hereinbelow with respect to the synchronization at the row startup.

Referring now to FIG. 4a, there is illustrated a diagrammatic representation of six pixels arranged in a 3×3 grid and a single dark bixel 62. The bixel 62, in a fully-aligned grid, will overlap four pixels 60, therefore providing a 2× oversampled system. Therefore, each row of pixels will have two pixels associated with one edge of a bixel, with the adjacent row also having two pixels associated with that bixel.

In the illustration of FIG. 4a, the bixel 62 is arranged such that it is displaced to the left of the border between pixels. Further, it is shifted downward somewhat. The output of a single row 66 of pixels is illustrated with a thick data waveform 68 representing the aligned data along a given row and an offset waveform 70 represented by a thin line that shows the actual data, the vertical dotted line representing the boundary of the pixels. A waveform 72 is provided below the waveforms 68 and 70 representing the resulting trash pattern. It can be seen that when the bixel 62 overlaps the boundaries of any of the pixels 60, there will be a reduced output from the pixel 60 which is only partially covered by the bixel 62 when changing from a dark to a light bixel, i.e., at the "transition", representing a change from a logic "0" to a logic "1". For example, if a light image was represented by an output of 100,000 (100K) photons, an overlap of a light image into an adjacent pixel that is associated with a dark image may result in 10K photons output. Since it only partially overlaps this pixel, this is represented by an area 74 in the bixel 62 and an area 76 in the trash pattern waveform 72. Similarly, when the transition from the light bixel to the dark bixel occurs, there will be insufficient filling of the associated trailing pixel 60 and there will be less than full output therefrom. This is represented by an output of, for example, only 90K photons, this represented by an area 78 in the bixel 62 and an area 80 in the waveform 72.

Figure 4B:
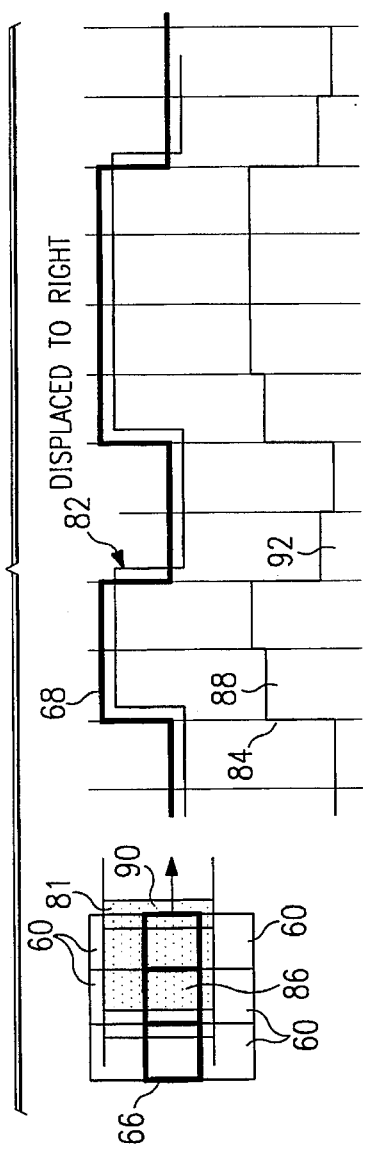

Referring now to FIG. 4b, there is illustrated a situation wherein a bixel 81 is provided in the 3×3 array of pixels 60 that is offset to the right. This is represented by a waveform 82 that is disposed to the right of the desired aligned waveform 68. The resultant trash pattern is represented by a waveform 84. It can be seen in this situation that a transition from a dark bixel to a light bixel will result in the leading pixel 60 associated with the bixel for a given row being less than full at a level of, for example, 90K photons. This is represented by an area 86 in the bixel 81 and an area 88 in the waveform 84. Similarly, the transition from a light bixel to a dark bixel will overlap into the adjacent pixel resulting in an area 90 in the pixel 81, corresponding to an area 92 of, for example, 10K photons output from the adjacent pixel 60.

In order to correct the resultant trash patterns of the waveforms 72 and 84 for either the left displacement or right displacement condition, the state machine assigns expected states to the pixels. The state machines will seek 1-1 or 0-0 pairs in the shift-corrected data. The pixels 60 are allocated into decoding periods, or states, depending upon the current pixel and what is expected next. The "expected state" is anticipated because, for a nominal 2:1 oversampling, each data bit is represented by two pixels in a given row. The light bixel will be represented by two image pixels labelled with states W1 and W2 and the dark bixel will be represented by two pixels labelled with states B1 and B2. FIG. 5a has the state names applied to the waveforms of FIG. 4a, and FIG. 5b illustrates the state names applied to the waveforms of FIG. 4b.

With respect to FIG. 5a, it can be seen that the data pattern is comprised of the data stream "010110". Therefore, this will be comprised of the image pixel stream states "B1, B2, W1, W2, B1, B2, W1, W2, W1, W2, B1, B2". The waveform 72 is labelled with the photon output, which for a full photon output will be 100,000 photons or "100K", with the overlap being approximately 10%. This will result in the leading edge of the bixel being displaced to the left of the expected pixel in the preceding pixel, such that the output of that pixel will be approximately 10% of full output. However, this will result in the trailing edge of the bixel not completely filling the expected trailing pixel, i.e., the W2 pixel, thus resulting in an output that is approximately 10% lower or 90K. The bixel will therefore be represented by areas 100, 102 and 104, having outputs of 10K, 100K and 90K, respectively. It can be seen that the output of the image pixels associated with the expected output illustrated by waveform 68 exhibit a trend wherein a logic "1" goes from the level of 100K to a level of 90K, i.e., a downward trend. Conversely, a logic "0" value will have a trend going from a value of zero to a value of 10K, i.e., an upward trend. By examining two adjacent pixels, it can be determined whether this is a logic "1" or a logic "0".

Referring now to FIG. 5b, there is illustrated the state labels associated with the waveforms of FIG. 4b. In this mode, the bixel is displaced to the right and, therefore, the actual output of the leading pixel associated with a light bixel will have a lower than expected output, whereas the leading pixel in a dark bixel will have a higher than expected state when following a light bixel. Therefore, the light image or logic "1" bit will exhibit a change from a lower than expected value to a full value at the transition from a dark bixel to a light bixel. This is an upward trend. A dark pixel following a light pixel will exhibit a downward trend going from a higher than expected value in the leading pixel to an expected value in the trailing pixel. These trends are precisely opposite to those shown in FIG. 5a for the left-shifted case.

Referring now to FIG. 6a, there is illustrated a detail of the energy shifting method. It is recognized that when a light bixel overlaps into an adjacent pixel associated with a dark bixel, the output of that adjacent pixel is either less than expected or more than expected. If it is more than expected, this energy can be shifted back into the pixel wherein there was a less than expected output. In FIG. 6a, there is illustrated a diagram corresponding to FIG. 5a. It can be seen that the leading edge of the initial bixel at an edge 106 overlaps into a preceding pixel to the first expected pixel output W1, such that the pixel in which the edge 106 occurs will have an energy level 108 that is greater than expected, as illustrated in a resultant waveform 107. The next pixel, W1, will have an expected level, but the trailing pixel, W2, will be associated with an edge 110 that falls prior to the end of the pixel, such that less than a full output will be achieved. This is represented by an energy deficient area 112, within a resultant waveform 107. This continues for each pixel. By moving the excess energy in area 108 to the energy deficient area 112, i.e., an energy shift to the right, this can be corrected.

Referring now to FIG. 6b, there is illustrated a diagram similar to that of FIG. 6a, but representing a situation depicted in FIG. 5b, i.e., when the bixel is displaced to the right of the image pixel boundary. In this situation, the initial pixel in which the transition from a dark bixel to a light bixel occurs will have an edge 114, this being the expected pixel W1. As such, less than full illumination will occur in pixel W1, resulting in an energy deficient area 116 in a resultant waveform 118. The pixel W2 associated with the expected trailing edge pixel will have a full output but the next pixel, that associated with the B1 pixel of a dark bixel will have the transition from a light bixel to a dark bixel occurring therein at an edge 120. This will result in an excess energy area 122 within the waveform 118. To adjust for this, it is necessary to shift the energy to the left by shifting the excess energy in area 122 to the deficient energy area 116.

Referring now to FIG. 6c, there is illustrated a detail of the energy shifting operation for a shift right operation. This is represented for the left displaced configuration of FIG. 6a. It can be seen that for a transition from a dark to light there will be a region of excess energy 126 associated with the trailing B2 pixel in the dark image that must be shifted to the trailing W2 pixel in an energy deficient area 128. This is achieved merely by increasing the value therein. Therefore, it is only necessary to have knowledge of what the expected state is and then shift the energy. For example, if it is known that the image is displaced to the left, whenever a 10% left displacement exists, an increase in the output of a B2 dark pixel will indicate that the energy must be shifted to the W2 pixel in a subsequent light bixel that precedes a transition to a dark bixel. Therefore, the energy can be subtracted from the B2 dark bixel and then added to the next W2 pixel having an energy deficient area. This can be done in a serial fashion, such that the pixel output information does not have to be stored for a large number of bixels in a given row.

Figure 7A:
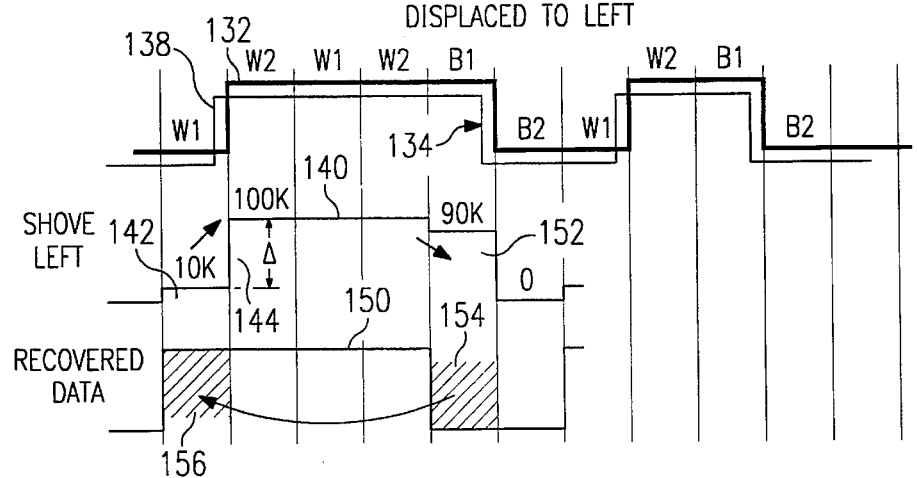
FIGS. 7a and 7b illustrate a diagrammatic view of the energy shifting operation during synchronizing at the row startup.
Figure 7B:
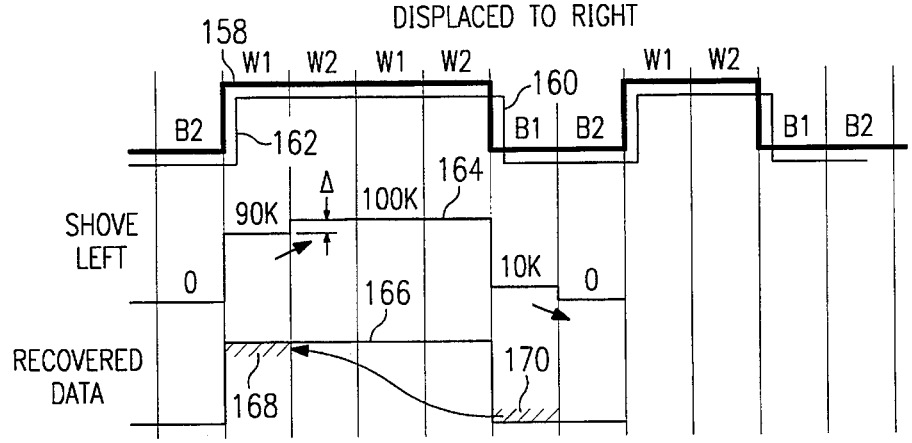

Referring now to FIGS. 7a and 7b, there are illustrated waveforms depicting the synchronization operation at zero startup. As described above with respect to FIG. 3, the row is initiated with two light bixels which follow two or more dark bixels. With specific reference to FIG. 7a, there is illustrated a waveform that corresponds to the situation wherein the bixel is displaced to the left of the pixel elements. This would correspond to an expected waveform 132 and an actual waveform 134. The waveform 134 illustrates a transition 138 whenever the first non-zero pixel occurs after passing through the dark border during a scan of a row. If the above-described procedure were followed, the energy from the pixel in which the transition 138 existed would be transferred to the trailing W2 pixel associated with the transition from a light bixel to a dark bixel. However, in the synchronization procedure, the pixel in which the first non-zero value occurs is assumed to be a logic "1" rather than a simple moire fragment. This will create an artificial phase-lead condition. As such, although the expected waveform is illustrated as being to the right of the actual waveform 138, the energy shift is made such that the pixel in which the first non-zero state occurs will have the energy shifted thereto such that the energy is moved to the left. The pixel associated with the edge 138 will now be assigned the expected state W1 and the next three pixels will be assigned the states W2, W1 and W2. Thereafter, depending upon the bixel sequence, the appropriate states will be assigned thereto.

The trash pattern or actual output associated with the waveform 138 is illustrated by a waveform 140 having the edges thereof aligned with the pixel boundaries. It can be seen that the first pixel assigned the state of W1 will have a low output, illustrated by an area 142, of approximately 10K photons. The next state, represented by an area 144, will have a full output of 100K photons with the delta therebetween being approximately 90K photons. Since this is a phase-lead condition, this indicates that energy must be shifted to the pixel associated with the state W1 from a later pixel associated with a transition from W2 to B1. This will result in a recovered waveform 150. To determine when the transition from the trailing pixel W2 to the leading pixel B1 of a light bixel to a dark bixel transition occurs, it is only necessary to look for a transition from a full level of 100K photons to a partial level of 90K photons, since this is a phase-lead condition. This occurs at an area 152 in the waveform 140 which is at a level of 90K photons. This represents an energy excess, represented by an area 154 in waveform 150, which is shifted to the portion of the recovered data waveform 150 associated with the W1 pixel, represented by an area 156. In general, by recognizing the condition that a change in level from 10K photons to 100K photons is a one, it is then only necessary to increase the level of 10K photons to 100K photons to classify this pixel as the W1 leading pixel from a dark bixel to a light bixel transition. Thereafter, this will constitute the criteria for a transition from dark bixel to a light bixel. Likewise, when the transition from 100K photons to 90K photons occurs, this will indicate the transition from a light bixel to a dark bixel.

Referring specifically to FIG. 7b, there is illustrated the condition wherein the actual waveform is displaced to the right of the expected waveform. An expected waveform 158 is illustrated with an actual waveform 160 displaced to the right thereof. As was the case with the description of FIG. 7a, the criteria for defining the actual W1 state for the first light bixel is to determine in which pixel the first transition from a dark bixel to a light bixel occurs, represented by a transition 162. This pixel is then defined as state W1. A waveform 164 represents the trash pattern or actual output of the pixels and a waveform 166 represents the recovered data. In this mode, a phase-lead condition actually exists and, as such, a transition from a dark bixel to a light bixel is indicated by a less than full output of 90K photons, making the transition to a full output in the next adjacent pixel. Of course, this illustration only results in a delta of 10K photons. Thereafter, it is only necessary to determine when the output makes a transition from a less than full output of 90K photons to a full output of 100K photons to determine when a transition from a dark bixel to a light bixel occurs. Similarly, whenever a transition occurs from a less than full output to a zero output, this indicates the dark pixel B1 following a light pixel W2. Therefore, the leading pixel W1 in the first light bixel in the string of bixels will have an output of 90K photons, which must have the energy shifted thereto and the level thereof raised to a full output of 100K photons. This is represented by an area 168. Similarly, whenever the output shifts from a level of 10K photons to a zero level, the pixel with a 10K photon output is assigned the state of B1 and the energy output thereof reduced in the recovered data waveform 166, as represented by an area 170 that is removed therefrom.

Once the determination is made as to the direction energy is shifted, this will continue along the row. However, it is possible to have some distortion along a row, such that the initial delta may change as the scan progresses across a row. For example, in the example of FIG. 7b, if a delta is initially 10K photons with the actual bixel transition being displaced to the right of the actual pixel border, the condition might exist wherein the displacement to the right increases as the row is scanned. This may result in the delta increasing. If this continues until the bixel image transition increased in displacement by more than one pixel, this would cause the delta to increase from 10K photons to 100K photons, at which point the states would shift to the right by one pixel. This could cause errors in the data.

Because displacement changes occur relatively slowly as processing of a row moves left-to-right, the hardware is constrained to only recognize changes in energy of small amounts from pixel-to-pixel. This has the effect of limiting the effects of noise in the processing; that is, by restricting changes in the observed shift amount (deltas) to very small amounts, the effects of local noise in the data is minimized. For example, as a row moves from left-to-right, energy may be shifted from one pixel to another. In this shifting operation, the amount of energy to be shifted is compared to the amount of energy shifted in the previous energy shift operation. If the difference therebetween is greater than a predetermined amount, the energy shifted is forced to the predetermined amount. By way of example, consider that the output of each of the pixels is a 4-bit word representing eight analog levels. If the allowable difference between two sequential energy shifts was equal to a value of "1" analog level, and if the difference in energy shift from one energy shift to the next subsequent energy shift were "3" analog levels, the actual energy shift would be forced to "1" analog level.

Figure 7C:
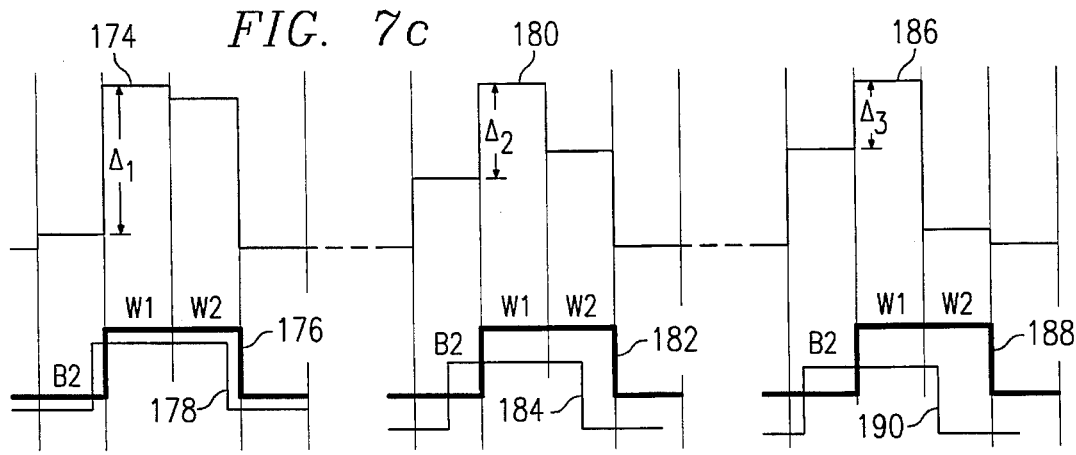
FIG. 7c illustrates a view of the row segment layout.

Referring now to FIG. 7c, the delta change as a function of distortion across the row is illustrated. The actual output waveform consists of a condition represented by a single dark bixel followed by a light bixel followed by a dark bixel, i.e., a checkerboard pattern. A first waveform 174 illustrates a transition from a level of 10K photons in the B2 state pixel to a level of 100K photons in the W1 state pixel. This is represented by an expected waveform 176, the left displaced actual bixel illustrated by a waveform 178. As the scan continues along the row, a second waveform, for example in the middle of the row, is illustrated by a waveform 180, which illustrates a transition from a less than full level output in the B2 pixel to a full level output in the W1 pixel with a delta that is less than the delta in the waveform 174. This is illustrated by the expected output 182 and the actual pixel waveform 184. As the scan continues down the row, another waveform 186 representing the actual output will occur wherein the delta between the B2 pixel and the W1 pixel decreases even further relative to the deltas associated with the waveforms 174 and 180. This is associated with an expected waveform 188 and the actual pixel waveform 190. If this continues, the delta will eventually reach a zero value and then the waveform will appear to be displaced to the right.

In order to compensate for this, a decision is made prior to the delta decreasing to a zero value. An arbitrary threshold of, for example, 50% is set for the delta. Whenever the value of delta is greater than 50%, both the left energy shift and the right energy shift occur as described above, i.e., in a displaced left position wherein the energy is shifted to the right; in a displaced right condition, the energy will be displaced to the left. However, when the delta increases or decreases to a level less than 50%, i.e., greater than 50% output, the "expected states" are shifted to the left and, thereafter, when the delta increases to a level greater than 50%, the expected states are shifted to the right. This is illustrated in FIG. 7d.

In FIG. 7d, there is illustrated a situation wherein a waveform 194 has a delta that is slightly greater than 50%, wherein the energy from the B2 pixel is shifted to the W2 pixel. Thereafter, if this were to continue, the next waveform, a waveform 198, would have a delta of less than 50%. However, at this point a decision is made that the full output pixel, which previously was the B2 pixel, is now assigned a state of W1, and the energy is shifted to the left as opposed to the right. Note that this is a shift of the state as opposed to a shift of energies. The energy shifting is a function of whether the actual bixel output edge is leading the expected state or lagging the expected state. It can be seen in the waveform of 198 that, for a checkerboard pattern, prior to a shift line 200 the W2 pixel is assigned to a state that preceded a B1 pixel. However, at the shift line 200, the previously assigned state of B2 is changed to an assigned state of W1 for the next pixel associated with the light bixel.

Referring now to FIG. 7e, there is illustrated a topological view of the detector array and detected image illustrating an arbitrary distortion. A line 202 is illustrated as being serpentined across the surface, representing the loci of points representing where the delta value would pass the threshold. On the left of the line 202, the states would be in a shift right position and on the right side of the line 202, the states would be shifted to the left. Of course, multiple lines 202 could exist along a given image output by the detector.

When making the decision whether to shift to the left or shift to the right, there is some hysteresis provided for noise purposes. If the threshold were at a given average value, the decision would be made to move from left to right at a first threshold value on one side of the average threshold and the opposite decision made to go in the opposite direction at a second threshold value on the opposite side of the average threshold. This is a general hysteresis technique that prevents any shifting on noise. Further, noise is eliminated by preventing the delta value from changing by more than a predetermined amount from one bixel to another, as described above.

Referring now to FIG. 8a, there is illustrated a layout of two rows of pixels along the entire scan path. The description hereinabove was directed only toward distortion along the y-axis. However, the distortion can also occur along the x-axis in the form of pincushion, etc. This can cause errors. In order to correct for these errors, each of the rows is divided into three separate columns, or more depending on the application. In the example, only three columns are provided. This provides three segments for each row, a row segment illustrated in FIG. 8b. Since there are two pixels for each bixel along the x-axis, it is only necessary to utilize this procedure for every other row. Typically, odd rows are utilized. It should be noted that as many columns as needed to correct vertical (Y-axis) pincushion are used. An odd number are preferred, but not necessary.

The three columns are referred to as row segments and are laid out in a left column 210, a middle column 212 and a right column 214. Each of the row segments is comprised of fields, the first field being a row number in a field 216, the second field being a data field 218 and the third field being a parity field 220, which contains a parity bit or some type of error checking bit. The error checking bit in field 220 is associated only with the data bits in field 218 and possibly the number bits in field 216. The first column, left column 210, includes a synchronizing field 222 which includes the two logic "1" bits for row synchronization.

When each of the row segments is scanned, a row number is detected, the data bits in field 218 are detected, and then the parity calculated. This parity is then compared to the parity bit in the field 220. If there is a comparison, this indicates that the scan was correct. However, if there is no comparison, this indicates that the data is in error.

Figure 9:
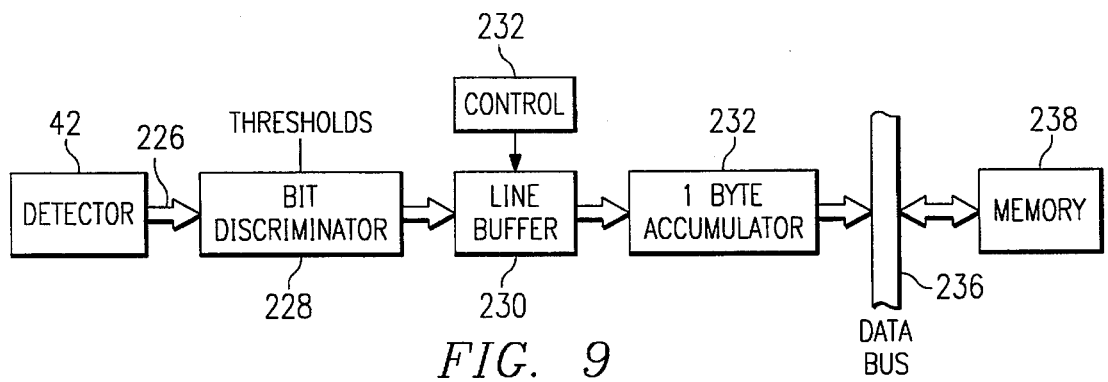
FIG. 9 illustrates a block diagram of the row segment buffer output during synchronization.

Referring now to FIG. 9, there is illustrated a block diagram for the system to generate the offset. The system generally receives small segments of the detector output from the detector 42 as data words on a bus 226, these being two bytes long and representing the top two pixels in two bixels. These are input to a bit discriminator 228 which is operable to determine whether the bixel is a light bixel or a dark bixel. These two byte segments are then input to the line buffer 230 which is controlled by a control circuit 232. Line buffer 230 is operable to buffer up lines, line buffer 230 also accounting for distortions along the Y-axis, as will be described hereinbelow. The output of the line buffer 230 is then input through a one byte accumulator 232 to a data bus 236, the data bus 236 providing the general system data bus which is accessible by all operations of the system. Although not all components are illustrated that are interfaced with the data bus 236, a main memory 238 is interfaced with data bus 236, which main memory is operable to receive the output of the one byte accumulator 232. Therefore, the one byte accumulator 232 is operable to transfer data from the line buffer 230 in one byte increments into the data bus 236 and, subsequently, to the memory 238.

Figure 10:
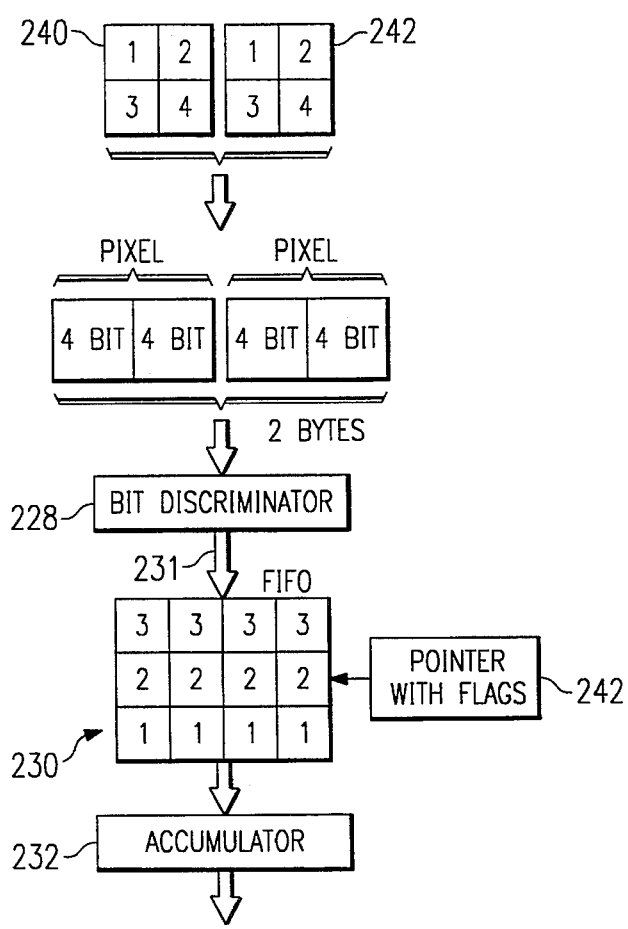
FIG. 10 illustrates a diagrammatic view of the operation of transferring data to the line buffer and accounting for distortion on the Y-axis.

Referring now to FIG. 10, there is illustrated a diagrammatic view of the operation of transferring data to the line buffer and accounting for distortion on the Y-axis. Each of the bixels is made up of four pixels, as described above. Two bixels 240 and 242 are illustrated, each comprised of a top row of two pixels and a bottom row of two pixels. The bixels 240 and 242 are adjacent to each other. The scanning operation is operable to select one row of pixels from two adjacent bixels and output the information therefrom. The analog value output from the CCD is first converted to a 4-bit digital word such that the four pixels in one row of the two adjacent bixels 240 and 242 comprise four 4-bit pixels, for a total of two bytes of information. This two bytes of information is transferred to the bit discriminator 228, which is operable to determine from the information therein whether the data is a light image or a dark image, such that each two pixels for a given row of each bixel will be processed to convert the eight bits of information to a single bit of information represented as a binary "1" or "0". This information is then fed as two bits from both of the bixels 240 and 242, to a 2-bit data bus 230 for input to the line buffer 230. The line buffer 230, in this embodiment, is comprised of a 3-deep FIFO with three 512×1 registers, each of the registers associated with a single line. Each of the single registers in the FIFO is divided into four segments, each segment associated with one row segment in the display, it being noted that the previous example utilized three row segments, whereas the illustration in FIG. 10 is associated with four row segments. However, any number of segments can be provided for in the FIFO for association with corresponding segments in the display, it being noted that the only requirement for a segment is that it has some type of error bit and row designator bit.

The first bixel in the row following the single row designator is then stored in the first location in the FIFOs for the associated segment. When all bixels have been processed through the bit discriminator for a given segment, the data in the segment is then analyzed to determine if it is a valid segment. Of course, this can be done on the fly, since the error detection configuration utilities a parity bit which merely requires counting the number of "1s" and "0s" that are loaded into the associated buffer segment and comparing this to the parity bit. If both the row designator is received and the parity bit compares true, the segment can be designated as valid. This will therefore allow the segment to be stored in the segment and then the next segment processed. However, if the next segment is determined to be invalid, the data stored therein is designated as being invalid, wherein the data stored therein can be written over. This is determined with a flag that is set or not set, in a pointer circuit 242. The pointer determines where in the FIFO the information is stored. Therefore, if, for example, the first, third and fourth segments compared true for the given row but the second segment compared false, then the next row of bixels would be examined with the first segment reading a segment associated with row two, the third segment and fourth segment also reading true with respect to row two. However, when the second segment was output, the first bit pair indicated that it was associated with row one, and since the flag was not set indicating that a valid row one segment was associated with the third buffer segment, this segment will be loaded into the second segment of row one. Therefore, it can be seen that by examining the first bit pair in each row segment and the flag associated with the corresponding buffer segment, it can be determined whether this row segment should be stored in the corresponding buffer segment. If it is stored, this will set the flag such that a subsequent row will not be stored therein. When all of the row one buffer is full, then it can be output to the one byte accumulator 232.

Figure 11:
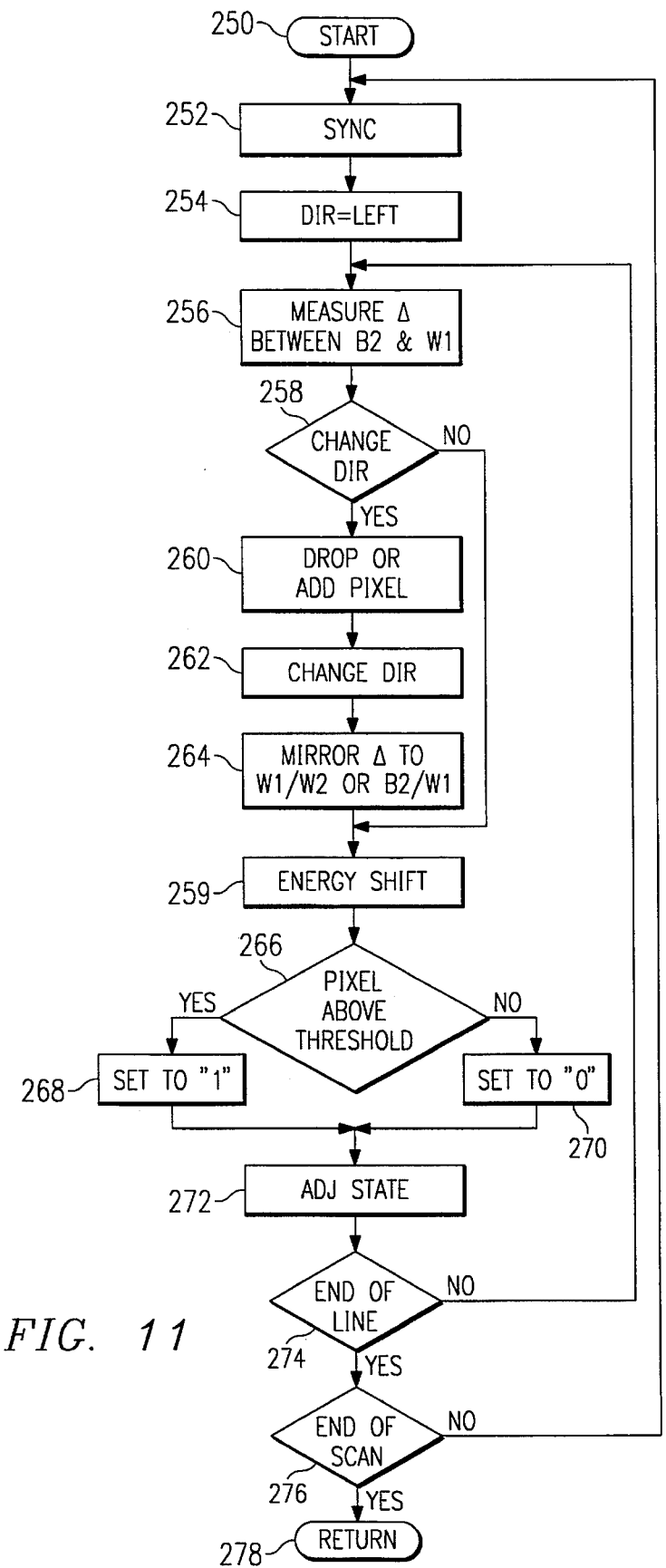
FIG. 11 illustrates a flowchart depicting the synchronization operation.

Referring now to FIG. 11, there is illustrated a flowchart depicting the synchronization operation, which is initiated at a start block 250 and then proceeds to a synchronization block 252. The synchronization block is the block that initiates the synchronization operation at the edge of the image. Thereafter, an arbitrary decision is made, as indicated by a function block 254, to set the energy shift direction as a left shift operation. However, it could be set to a right shift operation. The program then proceeds to a function block 256 to measure the delta between the B2 and W1 pixels and then proceeds to a decision block 258 to determine if the direction must be changed. If it is determined that the direction must be changed, the program will flow to a function block 260 to add or drop a pixel. This is illustrated with specific reference to FIG. 7d.

In FIG. 7d, it can be seen that when the shift operation was performed, it was performed after a transition from the W2 pixel to the B1 pixel, as illustrated by a transition 261. Once the shift is made, it can be seen that there no longer is a B2 bixel, but rather the B1 bixel preceding the shift line 200 constituted the B1/B2 bixel. Therefore, the system artificially forced the previous bixel to the left of the shift line 200 be only one pixel wide. If, for some reason, the distortion continued in that direction, it would only be necessary to occasionally force a bixel to be one pixel wide in order to maintain synchronization.

After it had been determined whether to drop or add a pixel in function block 260, the program would flow to a function block 262 to change the direction of the energy shift operation. The program would then flow to a function block 264 to mirror the delta such that it now operated between the levels of W1 and W2 or B2 and W1. This is illustrated with respect to FIG. 7d, wherein the energy shift to the right measured the delta between B2 and W1 and the energy shift to the left measured the delta between W1 and W2. The program would then flow to a function block 259 to perform the energy shift operation, as described hereinabove, and then to a decision block 266.

The decision block 266 determines whether the pixel should be a dark image or a light image. If the pixel value is above a threshold, the program will flow along a "Y" path to a function block 268 to set the logic state to a "1". If the bixel is not above the threshold, the program will flow along an "N" path to a function block 270 to set the logic state to a "0". The output of both function block 268 and 270 will then flow to a function block 272 in order to adjust the state. The program will then flow to a decision block 274 to determine if the last bixel was at the end of a line. If not, the program flows along an "N" path back to the input of the function block 256 to again measure the delta. If the bixel is at the end of the line, the program flows along a "Y" path to a decision block 276 to determine if it is at the end of the scan. If not, the program flows back to the input of function block 252 and, if so, the program flows to a return block 278.

Figure 12:
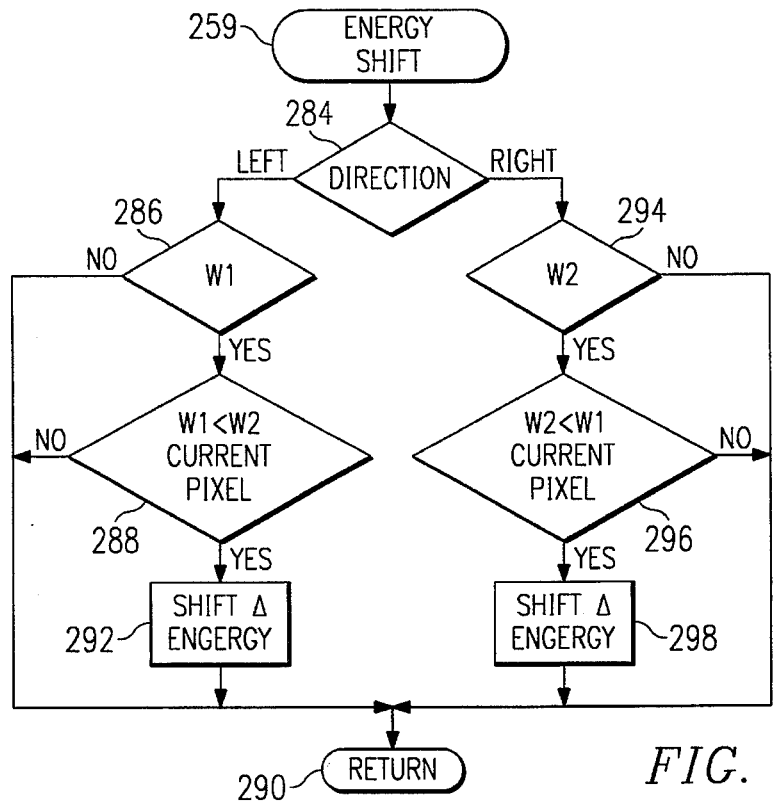
FIG. 12 illustrates a flowchart depicting the energy shift operation.

Referring now to FIG. 12, there is illustrated a flowchart depicting the energy shift operation of block 259. The program is initiated at the block 259 and then proceeds to a decision block 284 to determine whether the direction is left or right. If left, the program proceeds to a decision block 286 to determine if the pixel is in the W1 state. If so, the program flows to a decision block 288 to determine if the value of W1 is less than the value of W2 for the current bixel. However, if the current pixel is not W1, the program will flow to a return block 290 from decision block 286. If, at the decision block 288, the value of the W1 pixel is less than the W2 pixel for the current bixel, the program will flow along a "Y" path to a decision block 292 to shift the energy in the appropriate direction and then to the return block 290. If the value of W1 is not less than W2 for the current bixel, the program will flow directly to the return block 290 along an "N" path from decision block 288.

If the decision block 284 had determined that the shift direction were to the right, the program would flow to a decision block 294 to determine if the pixel were the W2 pixel. If not, the program would flow to the return block 290 and, if so, the program would flow along the "Y" path to a decision block 296 to determine if the value of the W2 pixel were less than the value of the W1 pixel for the current bixel. If not, the program would flow directly to the return block 290 and, if so, the program would flow along the "Y" path from decision block 296 to a function block 298 to perform the appropriate shift operation of the energy from one pixel to the other. The program would then flow to the decision block 290.

Figure 13:
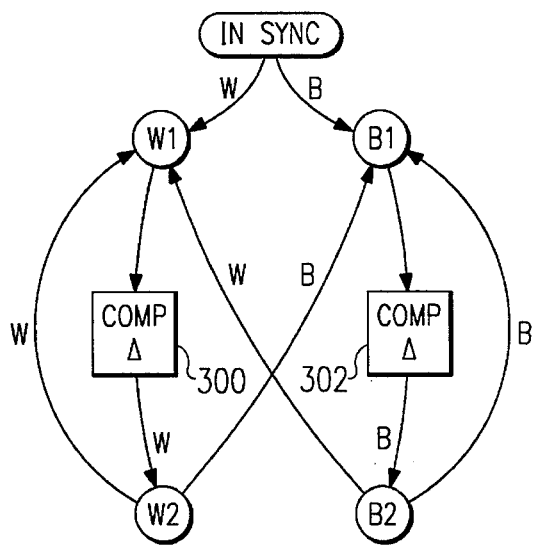
FIG. 13 illustrates a state diagram for the operation of adjusting the state of the imager pixels.

Referring now to FIG. 13, there is illustrated a state diagram for the operation of adjusting the state of the function block 272. In general, there are four states, W1, W2, B1 and B2. Whenever the system determines that synchronization is present, the next pixel will either be a white pixel or a black pixel. If it is a white pixel, the state diagram will flow to a state block labelled W1, which will force the state to W1. If it is determined that it is a black pixel, the state diagram will flow to a state block labelled B1 and force the state to B1. If the state is W1, the only possible state that can follow is W, which will force the state diagram to a block W2, associated with the state W2. Concurrent with this is a Δ comparison operation, indicated with a block 300. However, the next state can either be W or B, forcing the state diagram to either the W1 block or the B1 block. At the B1 block, the only state that can follow is a B state, which will force the state diagram to a B2 block to force the pixel to the B2 state. Concurrent with this is a Δ comparison operation, indicated with a block 302. The B2 state can either have a W state as the next state or a B state as the next state. With the B state, the diagram is forced back to the B1 state block, and if it is a white state, the state diagram is forced from the B1 block to the W1 block.

Figure 14:
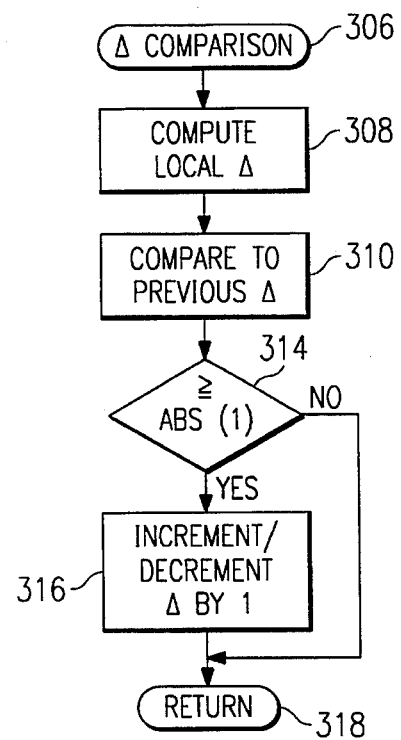
FIG. 14 illustrates a flowchart depicting the operation of a Δ comparison.

Referring now to FIG. 14, there is illustrated a flowchart depicting the operation of a Δ comparison. As described above, there is a running average of Δ that is maintained, which running average is utilized for the shift in direction. However, due to the presence of noise, an erroneous decision could be made due to a large jump in the value of Δ from a dark bixel to a light bixel. Since the value of A is computed as an average, it is important to ensure that large increases in the value between light and dark images does not occur. Therefore, the amount that the value of Δ can change from one bixel to another is limited to a value of "1" out of a total value of "16". By limiting any changes in the value of Δ to 1/16 of the total output value, noise can effectively be removed.

The program is initiated at a block 306 and then proceeds to a block 308 to compute the local Δ value. This local Δ value is generated by computing the change between the B1 and the W2 pixels or the B2 and W1 pixels, depending upon the energy shift direction. This Δ is computed and then compared to a previous Δ which has been previously calculated and stored. This is indicated by the function block 310. The program then flows to a decision block 314 to determine if the compared value has a difference that is greater than or equal to the absolute value of "1", i.e., it either decreases by a value greater than or equal to "1" or increases by a value greater than or equal to "1". If so, the program flows to a block 316 to increment/decrement the value of Δ by one and then store this for later use. The program then flows to a return block 318. Of course, if the decision block 314 had determined that the change in Δ was less than "1", the program would flow to the return block 318.

A program listing for the above operation is as follows:

```c
#include <stdio.h>
#include <ctype.h>
#include <string.h>
#include "dr.h"
pragma hdrstop include <alloc.h> define ROW 2                           /* Current row for debug */
define STRIPE (2*64)                   /* # Columns in striping */
#define BITMAX 15                       /* Highest value for a bit */
#define HYST 2                          /* Threshold hysteresis, in counts */

/** Declarations for local functions **/
static int Fetch_Pixel (bmp_info *Bmp);
static int Save_Pixel (bmp_info *bmp, int pixel);

/** Stack size allocation - Overrules Turbo-C's default **/
extern unsigned _stklen=16384;          /* Defaults to 4K..8K */ enum {NO_SYNC, W, WW, WWB, B, BB, BBW, IN_SYNC, SW1, SW2, SB1, SB2};
char *States[]= {"unk", "w",   "ww",   "wwb", "b", "bb", "bbw",
                 "syn", "sw1", "sw2", "sb1", "sb2"};

int Compare_Bmp (bmp_info *Bmp1, bmp_info *Bmp2, bmp_info *Bmp_D,
         bmp_info *Bmp_Rec) {
    int    I, K, Width, Ref, Avg_Data, Ref_Avg, Delta;
    int    Fcol, Dta_Addr, Data, Rec_Data, Err_Data, Size, Prev_Addr, N;
    int    Next, N_Pixels, Addr, Average, Decoded_Row_No, Bixel_Row_No;
    char   N_Rows_Printed, State, Busy, Find_Start, Not_Suspect;
    char   Lo, Hi, Shove_Left, Shove_Right, Parity;
    char   Line_Seg_Valid, Line_Seg_Valid_Index;
    long   Sum2;
    long   Even_Pixel_Errs, Odd_Pixel_Errs, Even_Row_Errs, Odd_Row_Errs;
    char   Sdr [512], Raw [512], Buf2 [512];
    int    Dta [512], Sft [512], Rf [512], Av [512], St_Hist [512];
```

```
int   Adr [512], Dlt [512], Output_Data [512];

Width = Bmp1->Width;
if (Width != Bmp2->Width) Fatal (9);          /* Sizes don't match  */
if (Bmp1->Height != Bmp2->Height) Fatal (9);

N_Rows_Printed = 0;
Decoded_Row_No = 0;
Bixel_Row_No   = 0;
Busy = 1;
Row   = N_Pixels = 0;
Even_Pixel_Errs = Odd_Pixel_Errs = Even_Row_Errs = Odd_Row_Errs = 0;

/*  Clear output array to 0x80 to set to known-bad value, for debug only */
    for (K=0; K<512; ++K) Output_Data [K] = 0x80; /* Set midscale */
    while (Busy) {
        if (N_Pixels) {                           /* Fill out rest of line */
            while (N_Pixels++ != 512) Save_Pixel (Bmp_D, 1);
            }

State = NO_SYNC;                          /* Resync at line start */
        ++Row;                                    /* Row#, 1..n */
        if (Row > Bmp1->Height) break;

/*      Accumulate a single row of pixels */
        Line_Seg_Valid = 0;                       /* Reset segment-valid flags *
        Line_Seg_Valid_Index = 8;                 /* 4th Bit is 1st segment */
        Shove_Right = Shove_Left = 0;             /* No shifting to be done */
        Find_Start  = 1;                          /* Look for start-bit pair */
        Delta = 0;
        Sum2  = 0;
        Addr  = 0;
                   for (K=0; K<Width; ++K) {                 /** Buffer one row **/
            Data = Fetch_Pixel (Bmp1);            /* Get raw pixel */
            Ref  = Fetch_Pixel (Bmp2);
            if (Data < 0) {
                if (Ref<0) {                      /* All done */
                    Busy = 0;
                    break;
                    }
                return 0;                         /* File's not same size */
                }

/*          Process the scaling of the reference pixel */
            if (Ref < 0) return 0;                /* File's not same size */
            Ref  = (Ref >> 4) & BITMAX;
            Sum2 += Ref;
            Buf2 [K] = Ref;

/*          Find start bit (2 1's in left column) */
            Data = (Data >> 4) & BITMAX;          /* Pixels go 0..15 */
            if (Find_Start && Data<2) continue; /* Ignore leading zeros */
            else Raw [Addr++] = Data;

/*          Process scaling of data pixel, and of establishing initial sync */
            if (Find_Start==1) ++Find_Start;      /* Compare init'l pair of 1s *
            else if (Find_Start==2) {
                Find_Start  = 0;
```

```
            Delta = Raw [1] - Raw [0];

if (Delta==0) ;                    /* No adjustments needed */

/*          NOTE: Below case probably represents noise */
            else if (Delta < 0) {              /* Shift left */
                Delta = -Delta;
                Shove_Left  = 0;
                Shove_Right = 1;
                Error (10, "Didn't expect shove-left case");
                }
            else {                             /* Shift right */
                Shove_Left  = 1;
                Shove_Right = 0;
                }

State = SB2;     /** NOTE: S.b. SW1? **/
            }
        } while (Addr < 512) Raw [Addr++] = 0;   /* Fill in right for shrink */
        Ref_Avg = Sum2 / Width;

Even_Row_Errs = Odd_Row_Errs = 0;
        Prev_Addr = -1;

/*      Process a single row */
        Parity   = 0;                          /* Reset parity (ends odd) */
        N_Pixels = 0;                          /* # Pixels done */
        Addr     = -1;                         /* Reference col ctr */
        Next = Raw [0];                        /* Next pixel value to do */
        Dta_Addr = -1;
        Find_Start = 1;                        /* For init'l sync condx */
        Not_Suspect = 1;                       /* Row segment is not suspect
        while (1) {
            ++Dta_Addr;
            ++Addr;                            /* Reference address */

/*          Compute a 16-pixel average value, for a 16-pixel block */
            if ((Dta_Addr&15)==0) {
                Average = Avg_Data = 0;
                Lo = BITMAX;
                Hi = 0;
                for (I=0; I<16; ++I) {
                    Data = Raw [Dta_Addr+I];
                    Average += Data;
                    if (Lo>Data) Lo = Data;
                    if (Hi<Data) Hi = Data;
                    }

Avg_Data = Average / 16;
                if (Avg_Data==0 && Average>=8) Avg_Data = 1;
                }

/*          Adjust image for left/right slip or advance */
            if (Find_Start) ;
            else if (Delta > Avg_Data+HYST) {
                if (Shove_Left) ++Dta_Addr;
                else --Dta_Addr;
```

```
/**         if (!Find_Start) Delta = Avg_Data - HYST; **/
            Delta = Avg_Data - HYST;
            Shove_Left  ^= 1;
            Shove_Right ^= 1;
            } if (Addr > 511 || Dta_Addr>511) break;

Rf  [Addr] = Ref = (Buf2 [Addr] >= Ref_Avg) ? 1 : 0;
        Adr [Addr] = Dta_Addr;

if (Row==ROW && Dta_Addr==Prev_Addr)
            printf ("\n*** Slip at column %u ***\n", Dta_Addr);
        else if (Dta_Addr==Prev_Addr+1) ;
        else if (Dta_Addr==Prev_Addr+2 && Row==ROW)
            printf ("\n*** Skip at column %u ***\n", Dta_Addr);
        else if (Row==ROW) printf ("\n*** Slip at column %u ***\n", Dta_Addr);

/*      Take delta from a neighbor and include it with current sample */
        Data = Next;                    /* Grab prefetched data */
        Next = Raw [Dta_Addr+1];

if (Shove_Right) {
            if (State==SB1) Data -= Delta;   /* Start of string of 0s */

/*          NOTE: Noise will foul up the below check */
            else if (State==SW1 && Data>Next) { /* End of string of 1s */
                Data += Delta;
                Next = 0;
                Find_Start = 0;              /* Reset for shove-right case */
                }
            } else if (Shove_Left) {
            if (Data==Next) ;                        /* String of 1s or 0s */
            else if (Find_Start) {                   /* Line startup condition */
                Find_Start = 0;
                Data += Delta;
                }
            else if (State==SB1 && Next > Data) Next += Delta; /* Steal from */
            else if (State==IN_SYNC && (Data+Delta) > Avg_Data)
                Data += Delta;
            else if (State==SW1 && Next < Data)      /* End of string of 1s */
                Next -= Delta;
            } if (Data>BITMAX) Data = BITMAX;
        else if (Data < 0) Data = 0;

/*      Clip the pixel to 1/0 based on average value in the vicinity */
        Sft [Addr] = Data;                  /* Save shifted version */
        Av  [Addr] = Avg_Data;
        Rec_Data = Dta [Addr] = (Data >= Avg_Data) ? 1 : 0;
        Parity ^= Rec_Data;                 /* Compute segment parity */

/*      Decode the row # from the data */
        K = Addr;
        if (Addr==7) K -= 4;                /* Skip 1,1 stripe in col 0,1 */
        if (Addr >= 7 && (K & (STRIPE-1))==3) { /* See if stripe-time */
```

```
            Decode  Row_No = 0;
            if (Dta [Addr-2]) Decoded_Row_No = 2;
            if (Dta [Addr]) Decoded_Row_No++;
            Not_Suspect = Decoded_Row_No==Bixel_Row_No; /* Probably ok */
K = ((Row-1) / 2) & 3;
if (Decoded_Row_No+1 != K) printf ("Row %d:  Decoded=%d\n", K, Decoded_Row_No)
            } if (Not_Suspect) Output_Data [Addr] = Rec_Data;
            if ((Addr & (STRIPE-1))==(STRIPE-1)) {

/*              Odd parity XOR'd with self (above) is now even */
                if ((!Parity & 1) && Not_Suspect) {
                    Line_Seg_Valid |= Line_Seg_Valid_Index;
                    Line_Seg_Valid_Index >>= 1;
                    }
                }

/*          Update state machine to track the synchronization of pixels
            with bixels. */
            if (State==IN_SYNC) {
                if (Rec_Data) State = SW1;
                else State = SB1;
                } else if (State==SW1) {
                if (Rec_Data) {
                    int Local_Delta;

Local_Delta = Raw [Dta_Addr-1] - Raw [Dta_Addr];

/*                  NOTE:  Below test may fail if noisy! */
                    if (Local_Delta==0) ;       /* No adjustments needed */
                    else if (Local_Delta < 0) { /* Shift left */
                        Local_Delta = -Local_Delta;
                        if (! (Shove_Left | Shove_Right)) { /* Avoid noise */
                            Shove_Left  = 1;
                            Shove_Right = 0;
                            }
                        } else {                      /* Shift right */
                        Shove_Left  = 0;
                        Shove_Right = 1;
                        } if (Local_Delta > Delta) ++Delta;
                    else if (Local_Delta < Delta) --Delta;

State = SW2;
                    } else State = SW2;
                } else if (State==SB1) {
                if (Rec_Data) State = SB2;
                else {
                    int Local_Delta;
```

```
                Local_Delta = Raw [Dta_Addr] - Raw [Dta_Addr-1];

/*              NOTE:  Below test may fail if noisy! */
                if (Local_Delta==0) ;         /* No adjustments needed */
                else if (Local_Delta < 0) { /* Shift left */
                    Local_Delta = -Local_Delta;
                    if (! (Shove_Left | Shove_Right)) { /* Avoid noise */
                        Shove_Left  = 1;
                        Shove_Right = 0;
                        }
                    } else {                        /* Shift right */
                    Shove_Left  = 0;
                    Shove_Right = 1;
                    }
                if   (Local_Delta > Delta) ++Delta;
                else if (Local_Delta < Delta) --Delta;

State = SB2;
                }
            } else if (State==SW2) {
            if (Rec_Data) State = SW1;
            else State = SB1;
            } else if (State==SB2) {
            if (Rec_Data) State = SW1;
            else State = SB1;
            } else if (State==NO_SYNC) {
            if (Rec_Data) State = W;
            else State = B;
            } else if (State==W) {
            if (Rec_Data) State = WW;
            else State = B;
            } else if (State==WW) {
            if (Rec_Data) State = WW;
            else State = WWB;
            } else if (State==WWB) {
            if (Rec_Data) State = W;
            else State = IN_SYNC;
            } else if (State==B) {
            if (Rec_Data==0) State = BB;
            else State = W;
            } else if (State==BB) {
            if (Rec_Data==0) State = BB;
```

```
            else State = BBW;
            } else if (State==BBW) {
            if (Rec_Data==0) State = B;
            else State = IN_SYNC;
            } else {
            Error (10, "#1");                  /* Illogical condition */
            printf ("State=%d, Row=%d, Dta_Addr=%d\n", State, Row, Dta_Add:
            State = NO_SYNC;
            break;
            }

I = (Shove_Right != 0);
        if (Shove_Left) I = 2;

Sdr [Addr] = I;
        Dlt [Addr] = Delta;
        St_Hist [Addr] = State;

/*      Compare the data and reference pixels for errors */
        Err_Data = ! (Rec_Data ^ Ref);

if (!Err_Data) {
            if (Row & 1) {
                ++Odd_Row_Errs;
                ++Odd_Pixel_Errs;
                }
            else {
                ++Even_Row_Errs;
                ++Even_Pixel_Errs;
                }

++Pixel_Errors;
            } if ((Row & 1)==0) Err_Data = 1;     /* Show odd rows only */
        if (Err_Data) Err_Data = 0xF0;      /* Set to full scale */

Save_Pixel (Bmp_D, Err_Data);       /* Save in DELTA.BMP file */
        ++N_Pixels;                         /* For end-of-line fill */

Prev_Addr = Dta_Addr;
        if (Row==ROW && (Addr&15)==15) {
            int Jcol;

Fcol = Addr & 0xFFF0;
            printf ("Row: %3d ", Row);
            for (N=0; N<16; ++N) printf ("%4d", Adr [Fcol+N]);
            Jcol = Dta_Addr - 15;
            printf ("\nRaw:     ");
            for (N=0; N<16; ++N) printf ("%4d", Raw [Jcol+N]);
            printf ("\nShifted: ");
            for (N=0; N<16; ++N) printf ("%4d", Sft [Fcol+N]);
            printf ("\nDelta:   ");
            for (N=0; N<16; ++N) printf ("%4d", Dlt [Fcol+N]);
            printf ("\nShft Dir:");
            for (N=0; N<16; ++N) {
```

```c
                    I = Sdr [Fcol+N];
                    printf ("%4.4s", I==1 ? "Rt" : (I==2 ? "Lt" : "-"));
                    }
                printf ("\nAvg_Dta: ");
                for (N=0; N<16; ++N) printf ("%4d", Av [Fcol+N]);
                printf ("\nRec_Data:");
                for (N=0; N<16; ++N) printf ("%4d", Dta [Fcol+N]);
                printf ("\nRef:      ");
                for (N=0; N<16; ++N) printf ("%4d", Rf [Fcol+N]);
                printf ("\nState:    ");
                for (N=0; N<16; ++N) printf ("%4s", States [St_Hist [Fcol+N]])
                printf ("\n");
                if (Odd_Row_Errs && (Row&1))
                    printf ("\t  #Errors=%3ld\n", Odd_Row_Errs);
                if (Even_Row_Errs && (Row&1)==0)
                    printf ("\t  #Errors=%3ld\n", Even_Row_Errs);
                printf ("\n");
                ++N_Rows_Printed;
                }
            }
/*      If entire set of row segments are valid, write (2) line copies to BMP
        if (Line_Seg_Valid==0xF) {              /* (4) segments valid */
            Line_Seg_Valid = 0x00;              /* Reset all (4) flags */
            Line_Seg_Valid_Index = 8;           /* Bit 4 is 1st segment */ for (N=0; N<512; ++N)
                Save_Pixel (Bmp_Rec, Output_Data [N] ? 255 : 0);
            for (N=0; N<512; ++N) {
                Save_Pixel (Bmp_Rec, Output_Data [N] ? 255 : 0);
                Output_Data [N] = 0x80;         /* Reset to known-bad value */
                }
            Bixel_Row_No = (Bixel_Row_No +1) & 3;
            } if ((Row&1) && Odd_Row_Errs)
        printf ("Row=%3d #Errors=%3ld\n", Row, Odd_Row_Errs);
    if ((Row&1)==0 && Even_Row_Errs)
        printf ("Row=%3d #Errors=%3ld\n", Row, Even_Row_Errs);
        Even_Row_Errs = Odd_Row_Errs = 0;
        }

/*  Write final record to the DELTA.BMP file */
    Size = Bmp_D->Buf_Size - Bmp_D->Buf_Bytes_Left;
    if (Size) {
        K = fwrite (Bmp_D->Buf, 1, Size, Bmp_D->File);
        if (K != Size) Fatal (7);           /* No room in file */
        }

/*  Write final record to the RECONSTR.BMP file */
    Size = Bmp_Rec->Buf_Size - Bmp_Rec->Buf_Bytes_Left;
    if (Size) {
        K = fwrite (Bmp_Rec->Buf, 1, Size, Bmp_Rec->File);
        if (K != Size) Fatal (7);           /* No room in file */
        } printf ("   Even-row bit (bixel) errs: %ld\n", Even_Pixel_Errs);
    printf ("   Odd-row  bit (bixel) errs: %ld\n", Odd_Pixel_Errs);
    return 1;
    }
```

```c
/*eject*/
/*********************** Fetch_Pixel ***********************
*                                                          *
* Function: Fetch the next pixel from the full buffer.     *
*                                                          *
* Author:   Tom Visel              Creation: 6-14-93       *
*                                                          *
* Remarks:  Fetch next pixel from the file's buffer.  If   *
*       buffer is empty, reload the buffer from the file.  *
*                                                          *
*       Unpack the individual pixel from the form stored in*
*       the file buffer, left-justifying the pixel in the  *
*       returned byte.                                     *
*                                                          *
*       If at the end of the file, return a value of -1.   *
*                                                          *
***********************************************************/
int Fetch_Pixel (bmp_info *Bmp) {
    int  I, Size;

if (Bmp->Pixels_Left==0) {  /* No pixels left in current byte */
        if (Bmp->Buf_Bytes_Left==0) {  /* No bytes left in buffer */
            Size = Bmp->Buf_Size;
            if (Bmp->File_Bytes_Left < Size) Size = Bmp->File_Bytes_Left;
            I = fread (Bmp->Buf, 1, Size, Bmp->File);
            if (I<1) return -1;         /* End of file */

Bmp->File_Bytes_Left -= I;  /* # Bytes left in file */
            Bmp->Buf_Bytes_Left = I;    /* # Bytes left in buffer */
            Bmp->Buf_Pos = 0;           /* Restart at top of buffer */
            }

Bmp->Byte = Bmp->Buf [Bmp->Buf_Pos++];
        Bmp->Buf_Bytes_Left--;
        Bmp->Pixels_Left = Bmp->Pix_per_Byte;
        }

--Bmp->Pixels_Left;                 /* Just robbed one */
    I = Bmp->Byte;                      /* Packed byte with pixel (s) */
    if (Bmp->Pixel_Bits==8) return I;   /* Keep all 8 bits */

I &= Bmp->Pixel_Mask;               /* Keep only desired pixel */
    Bmp->Byte <<= Bmp->Pixel_Bits;      /* Shift left to keep rest aligned */
    return I;
    }
/*eject*/
/*********************** Save_Pixel ************************
*                                                          *
* Function: Save next next pixel to delta file.            *
*                                                          *
* Author:   Tom Visel              Creation: 6-14-93       *
*                                                          *
* Remarks:  Pack the supplied pixel into the current storage*
*       byte.  If the byte is now full, save it in the file's*
*       buffer.  If buffer full, write the buffer to the file.*
*                                                          *
*       If at the end of the file, return a value of -1.   *
*                                                          *
***********************************************************/
int Save_Pixel (register bmp_info *Bmp, int Pixel) {
```

```
int  I;
char Pixel_Bits;

Pixel_Bits = Bmp->Pixel_Bits;        /* # Bits in one pixel */ if (Pixel_Bits==8) Bmp->Byte = Pixel;
else Bmp->Byte = (Bmp->Byte << Pixel_Bits) | /* Merge pixel w/byte */
                 (Pixel >> (8 - Pixel_Bits));

if (Pixel_Bits==8 || --Bmp->Pixels_Left==0) {/* Byte full.. Dump to buf */
    Bmp->Pixels_Left = Bmp->Pix_per_Byte;
    Bmp->Buf [Bmp->Buf_Pos++] = Bmp->Byte;

if (--Bmp->Buf_Bytes_Left==0) {
        I = fwrite (Bmp->Buf, 1, Bmp->Buf_Size, Bmp->File);
        if (I != Bmp->Buf_Size) Fatal (7);   /* No room in file */
        Bmp->Buf_Bytes_Left = Bmp->Buf_Size; /* # Bytes left in buffer */
        Bmp->Buf_Pos = 0;            /* Restart at top of buffer */
        }
    Bmp->Byte = 0;
    }
return 1;
}
```

In summary, there has been provided a method for removing distortion from a detected data image output by a holographic storage system. Distortion is removed along the x-axis by predicting a left/right shift of energy from a pixel output representing an overlap at the transition from a dark image to a light image to the pixel representing a transition from a light image to a dark image. This will result in a reconstructed output image. Along the y-axis, each of the rows are divided into segments and then each of the segments encoded with row information. This row information is then extracted from the row after scanning thereof and utilized to select the proper segment. When all segments of a row have been received, their respective buffers are forwarded to the output.

Although the preferred embodiment has been described in detail, it should be understood that various changes, substitutions and alterations can be made therein without departing from the spirit and scope of the invention as defined by the appended claims.

What is claimed is:

1. A method for distortion correction of a reconstructed holographic data image on an optical storage medium, which data image is comprised of a two dimensional grid of bit images in rows and columns of either a dark bit image or a light bit image, comprising the steps of:

providing a detection device having a surface on which is disposed a grid of imager pixels each having an output and corresponding to the grid of bit images, which imager pixels are for detecting the bit images;

directing the data image onto the imager pixels of the detecting device;

scanning the outputs of a row of the imager pixels;

measuring the output of each of the imager pixels during scanning thereof;

determining if the edge of a bit image is physically overlapping the boundary between two adjacent imager pixels through the step of measuring the output of the imager pixels; and shifting the output energy associated with the imager pixel that is overlapped to sum with at least the output of another one of the imager pixels to provide a reconstructed data image that is substantially shifted relative to the boundary of the imager pixels.

2. The method of claim 1, wherein the step of determining if the edge of the bit image is physically overlapping the boundary of two adjacent imager pixels comprises determining if the edge of a bit image between a dark image and a light image physically overlaps the boundary of two adjacent imager pixels.

3. The method of claim 2, wherein the step of providing a detection device comprises providing a detector device having a surface on which is disposed a grid of imager pixels having an oversampling ratio between approximately 1.7:1 and 2:1, such that for each column of bit images in the data image, there are two columns of imager pixels and for each row of bit images there are approximately two rows of imager pixels.

4. The method of claim 3, wherein each of the imager pixels is operable to output a full output level on the output thereof when a light bit image is substantially fully disposed thereover and provides substantially no output when a dark bit image is substantially fully disposed thereover.

5. The method of claim 4, wherein the step of determining comprises determining if the edge of a light bit image following a dark bit image is physically overlapping the boundary of two adjacent imager pixels through the step of measuring the output of the imager pixels.

6. The method of claim 5, and further comprising the step of determining if the edge of a light bit image preceding a dark bit image is physically overlapping the boundary of two adjacent imager pixels through the step of measuring the output of the imager pixels.

7. The method of claim 6, wherein the step of shifting the output energy comprises shifting the output energy in the imager pixel having an output that is greater than zero and which precedes an imager pixel having an output that is substantially at a full output level to sum with an imager pixel that has an output level that is less than a full output level and that follows an imager pixel with a full output level.

8. The method of claim 6, wherein the step of shifting the output energy comprises shifting the output energy in the imager pixel having an output level that is greater than zero and which precedes an imager pixel having an output level that is substantially a full output to sum with an imager pixel that has an output level that is less than a full output level and that follows a imager pixel with a full output level.

9. The method of claim 1, wherein each of the bit images is comprised of first and second imager pixels, wherein the step of shifting the output energy associated with the imager pixels comprises shifting the output energy associated with the first imager pixel in one bit image to the first imager pixel in the next adjacent bit image in a first energy shift direction and, in a second energy shift direction, shifting the output energy associated with the second imager pixel in one bit image to the second imager pixel in the next adjacent bit image.

10. The method of claim 1, wherein the step of determining comprises:

determining the difference between the highest output level one of the imager pixels associated with one of the bit images and the output of the corresponding one of the imager pixels associated with an adjacent bit image;

comparing the difference to a threshold; and shifting the direction of the energy shift when the difference exceeds the threshold.

11. The method of claim 10, wherein a first threshold for shifting in the first energy shift direction is provided and a second threshold for shifting in the second energy shift direction is provided, wherein the step of comparing the difference to the threshold comprises comparing the difference to the first threshold in the first energy shift direction and comparing the difference to the second threshold in the second energy shift direction.

12. A system for providing distortion correction of a reconstructed holographic data image on an optical storage medium, the data image comprised of a two-dimensional grid of bit images in rows and columns of either a dark bit image or a light bit image, comprising:

a detection device having a surface on which is disposed a grid of imager pixels each having an output and corresponding to the grid of bit images, said imager pixels for detecting the bit images;

said grid of imager pixels on the surface of said detection device operable to receive the data image on the surface thereof;

a scanning device for scanning the outputs of a row of said imager pixels;

a measurement device for measuring the output level of each of said imager pixels during the scanning thereof;

an overlap detector for determining if the edge of the bit image is physically overlapping the boundary between two adjacent imager pixels by comparing the measured output level of said imager pixels; and an energy shift device for shifting the output energy of the one of said imager pixels that is physically overlapped by one of the bit images to sum with at least the output of another one of said imager pixels to provide a reconstructed data image that is substantially shifted relative to the boundary of said imager pixels.

* * * * *